United States Patent
Westermann

(10) Patent No.: US 9,476,211 B2
(45) Date of Patent: Oct. 25, 2016

(54) WORKING DEVICE WITH A WORKING BOOM ARRANGED ON A ROTARY HEAD

(71) Applicant: Putzmeister Engineering GmbH, Aichtal (DE)

(72) Inventor: Karl Westermann, Walddorfhaeslach (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 14/780,773

(22) PCT Filed: Feb. 27, 2014

(86) PCT No.: PCT/EP2014/053778
§ 371 (c)(1),
(2) Date: Sep. 28, 2015

(87) PCT Pub. No.: WO2014/191125
PCT Pub. Date: Dec. 4, 2014

(65) Prior Publication Data
US 2016/0047133 A1 Feb. 18, 2016

(30) Foreign Application Priority Data
May 28, 2013 (DE) .................... 10 2013 209 878

(51) Int. Cl.
*E04G 21/04* (2006.01)
*F16M 13/02* (2006.01)

(52) U.S. Cl.
CPC ....... *E04G 21/0445* (2013.01); *E04G 21/0436* (2013.01); *F16M 13/022* (2013.01)

(58) Field of Classification Search
CPC .............. E04G 21/04; E04G 21/0445; E04G 21/0436; B66C 23/78; F16M 13/022; Y10T 137/8807
See application file for complete search history.

(56) References Cited

U.S. PATENT DOCUMENTS 3,101,150 A   8/1963  Janson et al.
3,707,990 A * 1/1973  Schaible ................... B60P 1/36
                                                      137/615
(Continued)

FOREIGN PATENT DOCUMENTS

DE    1 147 732 B     4/1963
DE   27 52 605 A1     6/1979
(Continued)

OTHER PUBLICATIONS

International Search Report of PCT/PCT/EP2014/053778, mailed Apr. 25, 2014.
(Continued)

*Primary Examiner* — Brodie Follman
(74) *Attorney, Agent, or Firm* — Collard & Roe, P.C.

(57) ABSTRACT

A working device has a substructure for receiving a supporting device for ground support and an elongated working boom. The one end of the working boom is mounted on a rotary head bearing block, which projects beyond the substructure, in a pivotal manner about a horizontal axis. Furthermore, the rotary head is mounted on a rotary bearing of the substructure in a rotatable manner about a vertical axis by a radially projecting bearing ring. The bearing block and the bearing ring of the rotary head are rigidly connected to each other via a base plate provided with a central opening. The rotary head has an annular reinforcing structure which points away from the mounting plate in the direction of the substructure and is concentric about the bearing ring, the reinforcing structure compensating for the non-roundness of the support structure of the bearing block in the circumferential direction of the bearing ring.

13 Claims, 4 Drawing Sheets

(56) References Cited

U.S. PATENT DOCUMENTS

| | | | |
|---|---|---|---|
| 3,964,512 A * | 6/1976 | Dumas | B65G 53/30 137/615 |
| 4,280,771 A | 7/1981 | Schwing et al. | |
| 4,397,396 A * | 8/1983 | Kay | B66C 23/78 212/195 |
| 4,496,062 A * | 1/1985 | Gattu | B66C 23/78 212/302 |
| 4,624,357 A * | 11/1986 | Oury | E04G 21/04 198/313 |
| 5,158,420 A | 10/1992 | Weyer | |
| 6,142,180 A * | 11/2000 | Woodling | B66C 23/42 137/615 |
| 6,230,741 B1 * | 5/2001 | Woodling | B66C 23/42 137/615 |
| 6,378,686 B1 * | 4/2002 | Mayer | B65G 21/14 198/311 |
| 6,675,822 B1 * | 1/2004 | Schmitz | E04G 21/04 137/15.09 |
| 6,786,233 B1 * | 9/2004 | Anderson | B66C 23/64 137/615 |
| 6,840,540 B2 * | 1/2005 | Fugel | B66C 23/80 280/763.1 |
| 6,871,667 B2 * | 3/2005 | Schwing | E04G 21/04 137/615 |
| 6,948,701 B2 * | 9/2005 | Knoerzer | H02G 1/08 254/134.3 FT |
| 7,478,834 B2 * | 1/2009 | Schlecht | B66C 23/42 280/763.1 |
| 7,591,089 B2 * | 9/2009 | Keany | E02F 3/3677 37/403 |
| 7,909,059 B2 * | 3/2011 | Wehner | B66C 23/78 137/615 |
| 8,224,577 B2 * | 7/2012 | Gelies | B66C 13/40 701/50 |
| 8,366,148 B2 * | 2/2013 | Benz | B62D 21/186 212/302 |
| 8,794,670 B2 * | 8/2014 | Fuegel | B66C 23/80 280/763.1 |
| 9,062,465 B2 * | 6/2015 | Neubert | E04G 21/0418 |
| 9,068,366 B2 * | 6/2015 | Petzold | B66C 23/78 |
| 9,175,484 B2 * | 11/2015 | Fuegel | E04G 21/0445 |
| 2009/0283163 A1 * | 11/2009 | Wehner | B66C 23/78 137/615 |
| 2012/0132606 A1 * | 5/2012 | Larsen | B66C 23/78 212/302 |
| 2014/0325976 A1 * | 11/2014 | Schabelreiter | B66C 23/54 60/477 |
| 2015/0110544 A1 * | 4/2015 | Gerlof | B60S 9/02 403/104 |
| 2015/0176608 A1 * | 6/2015 | Fuegel | E04G 21/04 280/830 |
| 2015/0204089 A1 * | 7/2015 | Ruppel | E04G 21/0436 248/558 |
| 2015/0316043 A1 * | 11/2015 | Braun | E04G 21/04 417/437 |
| 2015/0376908 A1 * | 12/2015 | Braun | E04G 21/0445 248/49 |
| 2016/0032602 A1 * | 2/2016 | Fugel | B66C 23/80 248/49 |
| 2016/0047133 A1 * | 2/2016 | Westermann | E04G 21/0436 137/343 |

FOREIGN PATENT DOCUMENTS

| | | |
|---|---|---|
| DE | 199 59 070 A1 | 6/2001 |
| DE | 100 32 622 A1 | 1/2002 |
| DE | 10 2008 007 917 A1 | 8/2009 |
| GB | 2 087 816 A | 6/1982 |
| GB | 2 417 478 A | 3/2006 |
| JP | S 63-151551 U | 10/1988 |
| JP | S63-151551 U | 10/1988 |
| JP | H11-117342 A | 4/1999 |

OTHER PUBLICATIONS

German Search Report in DE 10 2013 209 878.2, mailed Jan. 13, 2014 with translation of relevant part.

* cited by examiner

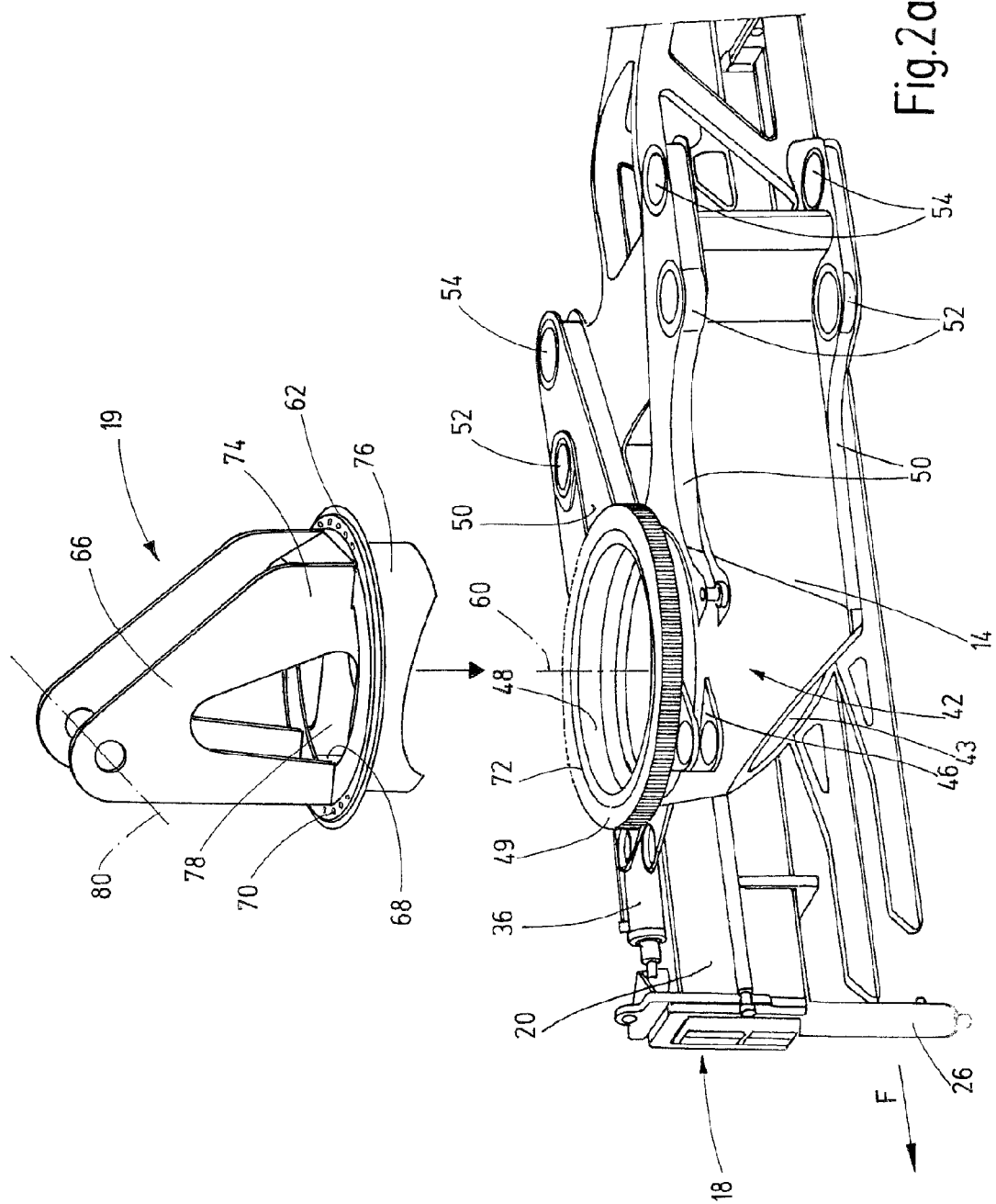

WORKING DEVICE WITH A WORKING BOOM ARRANGED ON A ROTARY HEAD

CROSS REFERENCE TO RELATED APPLICATIONS

This application is the National Stage of PCT/EP2014/053778 filed on Feb. 27, 2014, which claims priority under 35 U.S.C. §119 of German Application No. 10 2013 209 878.2 filed on May 28, 2013, the disclosures of which are incorporated by reference. The international application under PCT article 21(2) was not published in English.

The invention relates to a working device with a substructure for receiving a supporting device and with an elongate working boom, wherein one end of the working boom is mounted on a bearing block, which projects beyond the substructure, of a rotary head so as to be pivotable about a horizontal axis, wherein the rotary head is mounted on a rotary bearing of the substructure by means of a radially projecting bearing ring so as to be rotatable about a vertical axis, wherein the bearing block and the bearing ring of the rotary head are connected rigidly to each other via a baseplate provided with a central aperture, and wherein the bearing block forms a support structure, which extends in the longitudinal direction of the working boom substantially over the inside diameter of the bearing ring and is narrower transversely with respect thereto.

Working devices of this type, which are designed, for example, as truck-mounted concrete pumps, are known (DE 100 32 622 A1). The substructure has the object there of introducing the weight and the load moment of the working boom into the underlying structure via the supporting device. In the case of a concrete pump, the working boom is designed as a distributing boom which serves as a carrier for a concrete conveying line. Liquid concrete which is introduced continuously into a material feed container during the concreting operation is conveyed via the concrete conveying line to a concreting site arranged away from the location of the vehicle. The supporting device customarily comprises four support legs which are articulated on the substructure and can be supported on the underlying surface via hydraulic cylinders. The upper end of the rotary head of such a working device supports the working boom via a horizontal joint and the lower end of said rotary head is rotatably connected to the substructure via the rotary bearing. The rotary bearing is a highly loaded component which has to absorb the loads from the boom and pass said loads onto the supporting legs. The rotary head structure, which is designed as a bearing block, is customarily welded onto a baseplate. A flange ring with bores for introducing screws as connection to a rotatable bearing ring of the rotary bearing is located at the edge of the baseplate. The bearing block of the rotary head customarily has a distinctive support structure in the longitudinal direction of the boom, i.e. in the direction of action of the load. The diameter of the rotary bearing results from said load. In the transverse direction thereto, smaller loads act on the rotary head than in the longitudinal direction. The boom block of the rotary head is therefore significantly narrower in the transverse direction than the inside diameter of the rotary bearing. This contradicts the demands imposed on the use of a circular rotary bearing since the loads there are intended to be introduced into the bearing as uniformly as possible over the entire circumference. If this is not the case, pressure points and resulting damage to the bearing are unavoidable. It has therefore already been proposed to attach supporting metal sheets to the upper side of the baseplate, said metal sheets being intended to reinforce the baseplate all the way around and to distribute the load of the boom as homogeneously as possible to the bearing. Although this measure is effective, it requires a large amount of construction space to the side of the rotary head, said construction space being required there for accommodating the working boom, which is designed, for example, as an articulated boom.

Taking this as the starting point, the invention is based on the object of improving the known working device with rotary head to the effect that effective reinforcing of the baseplate of the rotary head without losses of construction space for accommodating boom parts is ensured.

In order to achieve this object, the combination of features specified in patent claim 1 is proposed. Advantageous refinements and developments of the invention emerge from the dependent claims.

The solution according to the invention substantially consists in that the rotary head has an annular reinforcing structure which points away from the baseplate in direction to the substructure and is preferably concentric with respect to the bearing ring. The effect achieved by this measure is that, in the mounted state, the reinforcing structure engages in the substructure in a concealed manner and does not have any disturbing outer contours.

In a preferred refinement of the invention, a bearing vessel, on the upper edge of which the rotary bearing, which is connectable to the bearing ring of the rotary head, is arranged and in which the reinforcing structure of the rotary head engages from above in a contactless manner is arranged in the substructure. The bearing vessel here forms a central part of the substructure as an interface between the working boom and the supporting device, to which interface the rotary head of the working boom is attached via the rotary bearing. The bearing vessel is therefore a highly loaded component which absorbs the loads of the working boom and passes said loads onto the supporting legs. The reinforcing structure is arranged here concentrically with respect to the vessel wall. A further improvement of the reinforcing function can be achieved by the fact that the bearing block engages by means of the lower end portions thereof through the baseplate into the vessel interior and is welded onto the reinforcing structure from the inside.

In a further advantageous refinement of the invention, the bearing block has two block halves which are arranged mirror-symmetrically at a lateral distance from each other and extend over the diameter of the baseplate in the longitudinal extent of the boom. The block halves here are expediently composed of a two-dimensional, metallic flat material, or the reinforcing structure is composed of a curved, metallic flat material. The reinforcing structure can in particular have the form of a hollow cylinder or a hollow truncated cone.

In conformation with the load moments arising via the angle of rotation of the reinforcing structure, the hollow cylinder or the truncated cone of the reinforcing structure expediently has a wall height which is variable in the circumferential direction. In conformation with the load distribution over the bearing ring circumference, the wall height of the hollow cylinder is higher here in the region of the longitudinal extent of the working boom than transversely with respect thereto.

According to a preferred refinement of the invention, the bearing ring of the rotary bearing can be driven by motor. For this purpose, the bearing ring advantageously has a toothed ring which meshes with at least one motor-driven driving pinion.

According to an advantageous application of the invention, the substructure is placeable onto a framework of a stationary or mobile concrete pump, wherein the working boom is designed as a multi-section concrete distributing boom arranged on the bearing block of the rotary head so as to be pivotable about a horizontal axis.

The invention is explained in more detail below with reference to the drawing, in which FIGS. 1a and b show a side view and a top view of a truck-mounted concrete pump with a distributing boom and a supporting device;

FIG. 2a shows a diagrammatic exploded illustration of the substructure of the truck-mounted concrete pump with a rotary head;

FIG. 2b shows an enlarged detail from FIG. 2a;

Figure 2B:
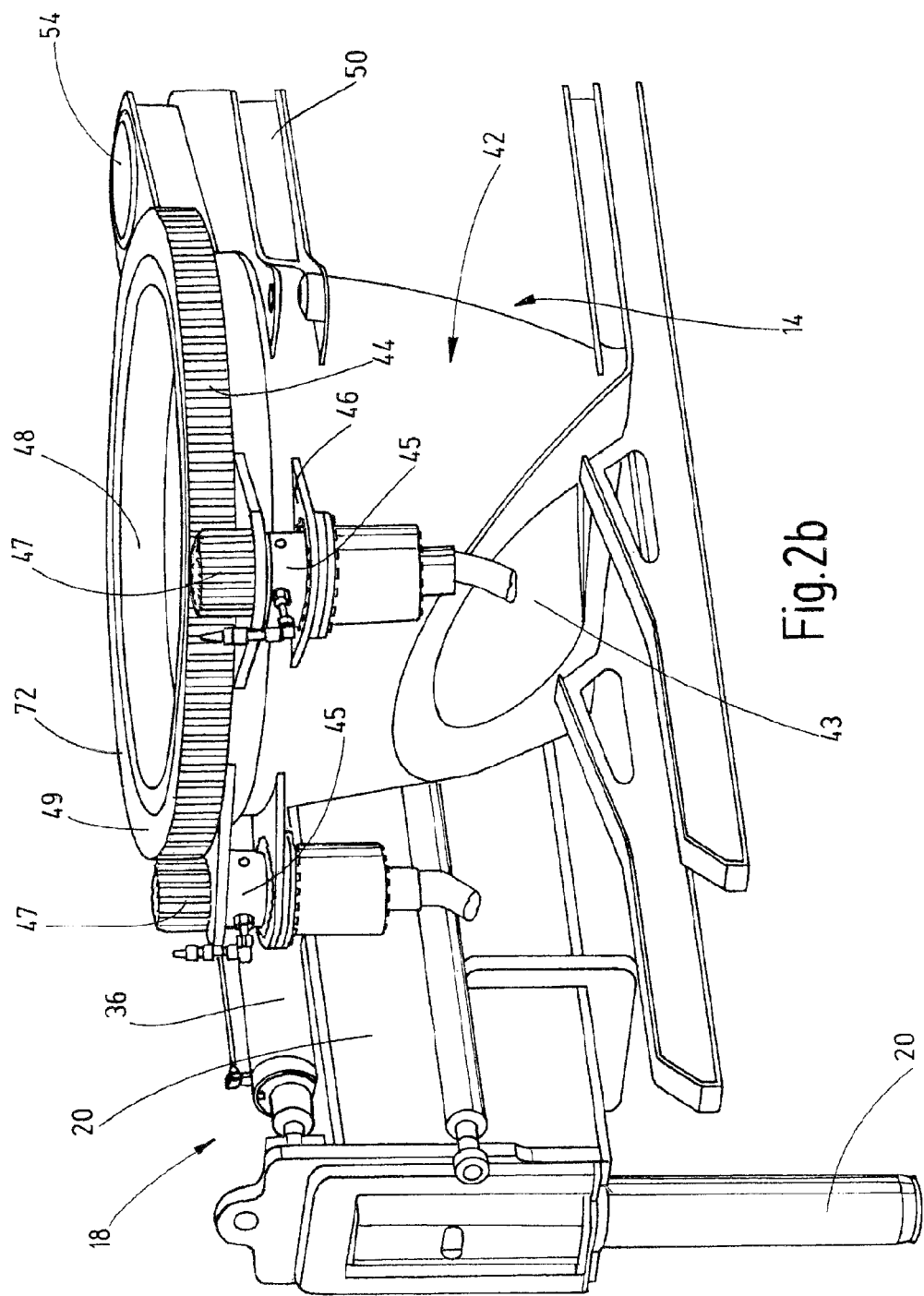
Figure 3A:
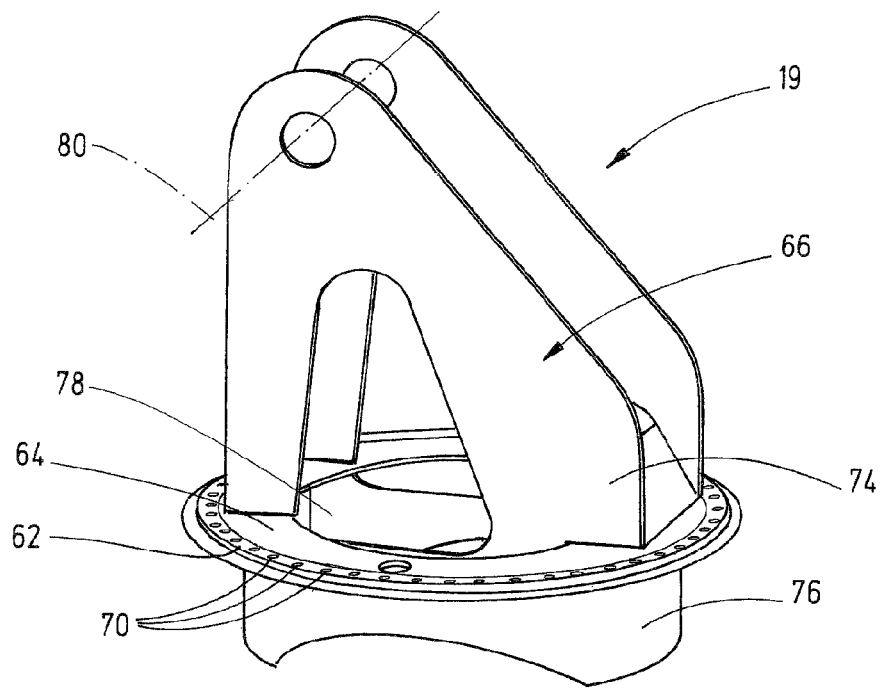
Figure 3B:
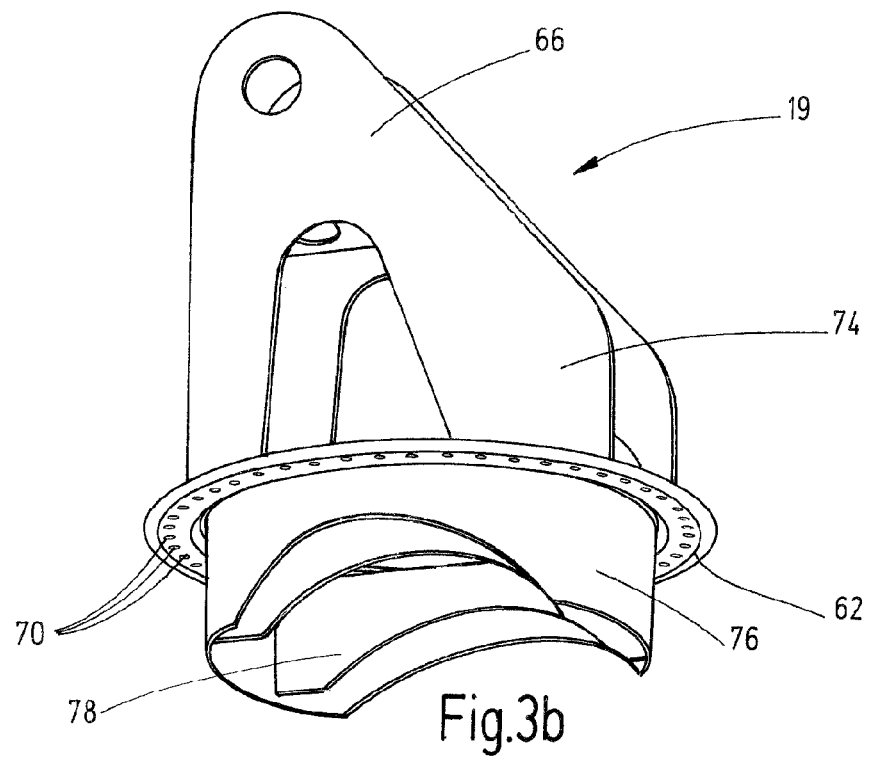

FIGS. 3a and b show a diagrammatic top view and a diagrammatic bottom view of the rotary head according to FIG. 2a with a reinforcing structure according to the invention.

Figure 1A:
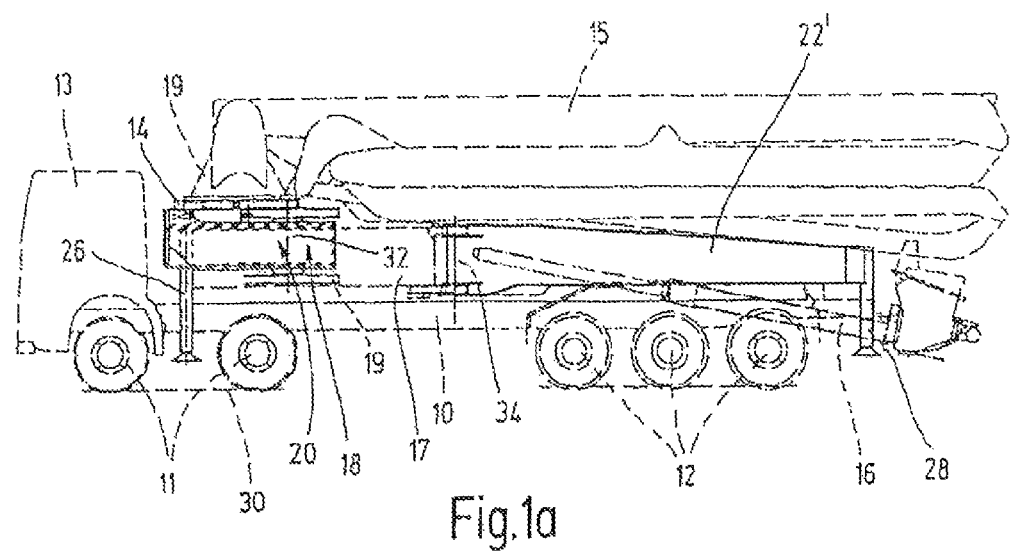
Figure 1B:
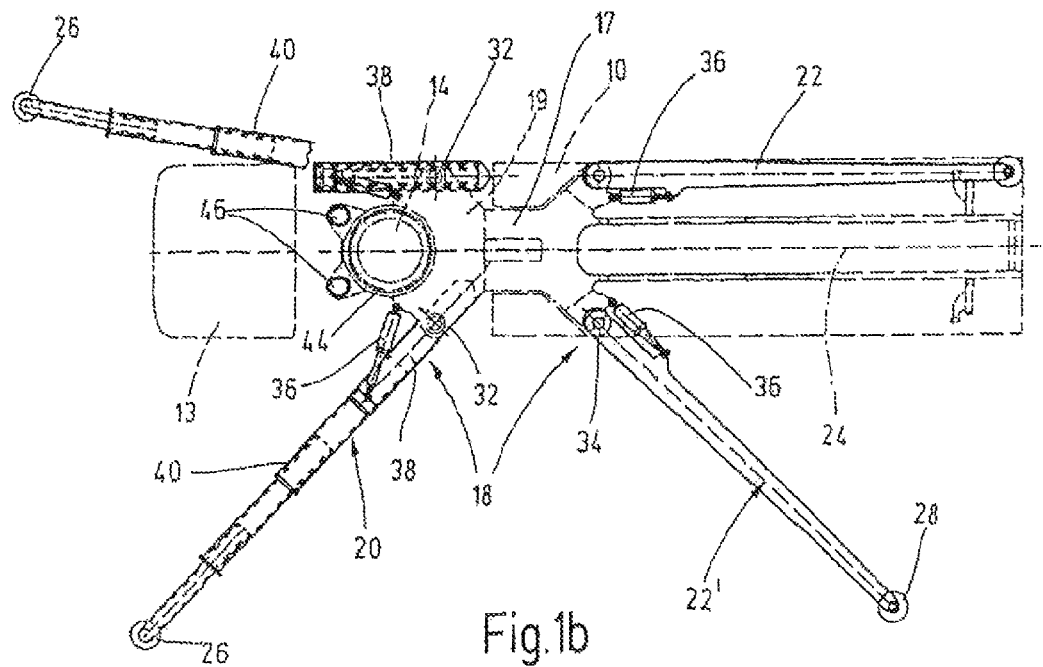

The truck-mounted concrete pump shown in FIGS. 1a and b essentially consists of a multi-axle chassis 10 with two front axles 11 and three rear axles 12, with a driver's cab 13, a working boom 15, which is mounted on a substructure 14 by means of a rotary head 19 so as to be rotatable about a vertical axis and is designed as a concrete distributing boom, with a pump arrangement 16 mounted on the chassis 10 at a distance from the rotary head, and with a supporting device 18. The supporting device 18 comprises two front supporting legs 20 and two rear supporting legs 22, 22', which are articulated on the substructure. The supporting legs are attracted in the transport position and are oriented parallel to the longitudinal axis 24 of the vehicle while, in the supporting position, said supporting legs protrude obliquely forward and rearward over the chassis and are supported by the foot parts 26, 28 thereof on the underlying surface 30. The front supporting legs 20 and the rear supporting legs 22, 22' are pivotable here about the vertical pivot axes 32, 34 thereof in relation to the substructure between the transport position and the supporting position with the effect of an extending cylinder 36 in each case. In addition, the front supporting legs 20 are designed as telescopic booms. As can be seen in particular from FIG. 1b, the supporting legs each comprise a boom box 38 which is pivotable about the vertical pivot axis 32 in relation to the substructure, and a telescopic part 40 consisting of two telescopic tubes.

The central part of the substructure 14 is the bearing vessel 42 which forms the interface between the distributing boom 15 and the supporting device 18. The rotary head 19 of the distributing boom engages from above in the bearing vessel 42 and is mounted rotatably on the bearing vessel 42 (cf. FIG. 2a). The drive takes place via a toothed ring 44, which is arranged on the bearing ring of the rotary bearing, with the aid of two hydraulic or electric driving motors 45 which engage by means of a driving pinion 47 in the toothed ring (cf. FIG. 2b). The driving motors 45 are arranged on tabs 46 of the bearing vessel 42. In addition, the bearing vessel 42 has a vertical passage opening 43 for the passage of a concrete conveying line (not illustrated). The bearing vessel 42 forms a vertical bearing for the working boom 15 arranged on the rotary head 19 and absorbs the loading over the height thereof. As can be seen from FIGS. 2a and b, the bearing arms 50 belonging to the substructure 14 are also welded behind the bearing vessel 42, the bearing arms having bearing eyes 52, 54 which are arranged at a distance from the vessel wall and at which in each case one of the supporting legs 20, 22, 22' is mounted pivotably about a vertical axis. As can be seen from FIG. 2a, the rotary head 19 is mounted on a rotary bearing 48 of the substructure 14 by means of a radially projecting bearing ring 49 so as to be rotatable about the vertical axis 60. The bearing block 66 of the rotary head 19 is arranged on a baseplate 64 provided with a central aperture 68. In addition, in the exemplary embodiment shown, a flange ring 62 is integrally formed on the baseplate 64 and is connectable to the bearing ring 49 of the rotary bearing 48 through the screw bores 70 by means of screws. The bearing ring 49 is mounted on the upper edge of the bearing vessel 42 via a rolling bearing 72 and the circumference of the bearing ring bears the above-described toothed ring 44.

As can be seen from FIGS. 3a and b, the bearing block 66 has a supporting structure 74 which is reinforced in accordance with the alignment of the working boom in the longitudinal direction thereof and extends over the entire inside diameter of the flange ring 62. The supporting structure 74 is of narrower design transversely with respect thereto. In order to load the rotary bearing 48 uniformly in the circumferential direction, a special characteristic of the invention consists in the rotary head 19 having a reinforcing structure 76 which points rigidly from the baseplate 64 in direction to the substructure 14 and is concentric with respect to the bearing ring 49. In the assembled state, the rotary head 19 engages by means of the annular reinforcing structure 76 thereof from above in the bearing vessel 42 in a contactless manner (FIG. 2a). Accordingly, the reinforcing structure 76 is also arranged concentrically with respect to the vessel wall. The reinforcing structure 76, like the bearing block 66, is welded to the baseplate 64 of the rotary head 19. The reinforcing structure has the form of a hollow cylinder or a hollow truncated cone and can have a variable wall height in the circumferential direction in conformity with the load distribution (FIGS. 3a and b). The bearing block 66 engages by means of the lower end portion 78 thereof through the baseplate 64 into the vessel interior and is welded there to the reinforcing structure 76 from the inside.

In summary, the following should be emphasized: the invention relates to a working device with a substructure 14 for receiving a supporting device 18 for support on the ground, and with an elongate working boom. One end of the working boom is mounted on a bearing block 66, which projects beyond the substructure 14, of a rotary head 19 so as to be pivotable about a horizontal axis 80. In addition, the rotary head 19 is mounted on a rotary bearing 48 of the substructure 14 by means of a radially projecting bearing ring 49 so as to be rotatable about a vertical axis 60. The bearing block 66 and the bearing ring 49 of the rotary head 19 are rigidly connected to each other via a baseplate 64 provided with a central aperture 68. A special characteristic of the invention consists in that the rotary head 19 has a reinforcing structure 76 which points away from the baseplate 64 in direction to the substructure 14 and is concentric with respect to the bearing ring 49 and compensates for the noncircularity of the support structure 74 of the bearing block 66 in the circumferential direction of the bearing ring.

LIST OF REFERENCE NUMBERS

10 Chassis
11 Front axles
12 Rear axles
13 Driver's cab
14 Substructure
15 Working boom
16 Pump arrangement
18 Supporting device 19 Rotary head
20 Front supporting legs
22, 22' Rear supporting legs
24 Longitudinal axis of the vehicle
26, 28 Foot parts
30 Underlying surface
32, 34 Vertical pivot axes
36 Extending cylinder
38 Boom box
40 Telescopic part
42 Bearing vessel
43 Passage opening
44 Toothed ring
45 Driving motor
46 Tab
47 Driving pinion
48 Rotary bearing
49 Bearing ring
50 Bearing arms
52, 54 Bearing eyes
60 Vertical axis
62 Flange ring
64 Baseplate
66 Bearing block
68 Aperture
70 Screw bore
72 Rolling bearing
74 Support structure
76 Reinforcing structure
78 Lower end portion (bearing block)
80 Horizontal axis

The invention claimed is:

1. A working device comprising:
a substructure having a supporting device which is supportable on an underlying surface, a bearing vessel rigidly connected to the supporting device, and a rotary bearing arranged on an upper edge of the hearing vessel;
a rotary head mounted on the rotary bearing via a radially projecting bearing ring so as to be rotatable about a vertical axis;
a working boom being mounted to a bearing block of the rotary head so as to be pivotable about a horizontal axis (80), and
a base plate that rigidly connects the bearing block to the bearing ring, the base plate being provided with a central aperture,
wherein the bearing block forms a support structure, which extends in a longitudinal direction of the working boom substantially over an inside diameter of the bearing ring and is narrower transversely with respect thereto,
wherein the rotary head has a reinforcing structure pointing rigidly away from the baseplate in a direction of the substructure, and
wherein the reinforcing structure of the rotary head extends into the bearing vessel from above.

2. The working device a claimed in claim 1, wherein the reinforcing structure is of annular design and is arranged concentrically with respect to the bearing ring.

3. The working device as claimed in claim 1, wherein the reinforcing structure is of annular design and is arranged concentrically with respect to the vessel wall.

4. The working device as claimed in claim 1, wherein the bearing block and the reinforcing structure are welded to the baseplate.

5. The working device as claimed in claim 1, wherein the rotary head is secured releasably on the rotatable bearing ring of the rotary bearing by a radially projecting flange ring (62) arranged on the baseplate.

6. The working device as claimed in claim 1, wherein the bearing block has two block halves which are arranged mirror-symmetrically at a lateral distance from each other and extend over the diameter of the baseplate in the longitudinal direction of the working boom.

7. The working device as claimed in claim 6, wherein block halves are composed of a two-dimensional, metallic flat material.

8. The working device as claimed in claim 1, wherein the reinforcing structure is composed of a curved, metallic flat material.

9. The working device as claimed in claim 1, wherein the reinforcing structure has the form of a hollow cylinder or a hollow truncated cone.

10. The working device as claimed in claim 9, wherein the hollow cylinder or the truncated cone of the reinforcing structure has a wall height which is variable in the circumferential direction.

11. The working device as claimed in claim 1, wherein the bearing block engages by means of the lower end portion thereof through the baseplate into the vessel interior and is welded from the inside onto the reinforcing structure.

12. The working device as claimed in claim 1, wherein the bearing ring of the rotary bearing bears a toothed ring which meshes with at least one motor-driven driving pinion.

13. The working device as claimed in claim 1, wherein the substructure is placed onto a framework of a stationary or mobile concrete pump, and wherein the working boom is designed as a multi-section concrete distributing boom which is arranged on the bearing block of the rotary head so as to be pivotable about a horizontal axis.

* * * * *